3,748,205
METHOD AND APPARATUS FOR MAKING A PROFILE BAG STRUCTURE
Richard C. Adams, West Barrington, R.I., assignor to G. T. Schjeldahl Company, Northfield, Minn.
Filed May 27, 1971, Ser. No. 147,445
Int. Cl. B32b 31/00
U.S. Cl. 156—252                                           4 Claims

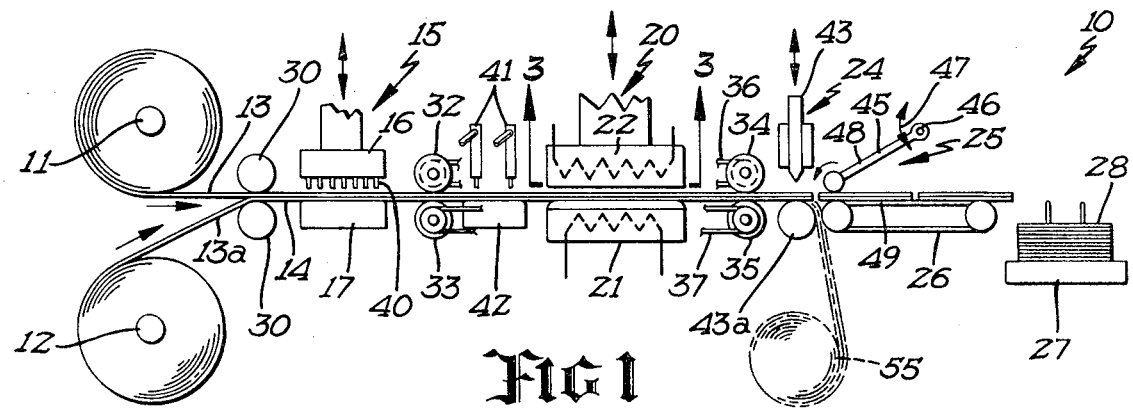
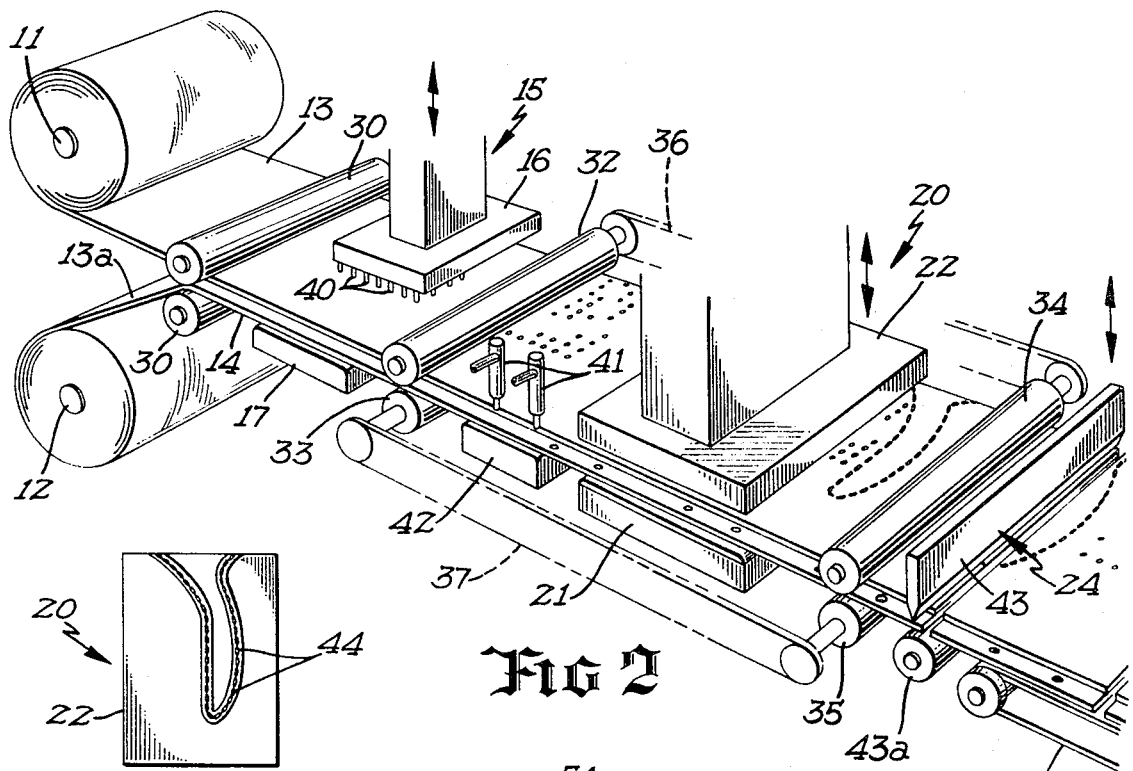
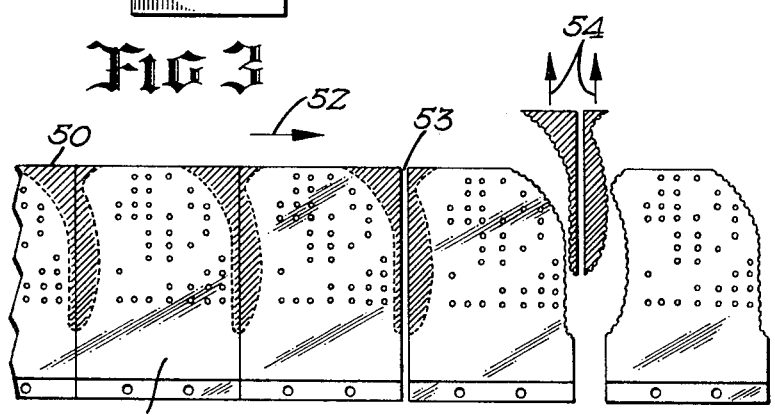
INVENTOR.
*Richard C. Adams*
BY
*Orrin M. Haugen*
ATTORNEY ›
United States Patent Office 3,748,205
Patented July 24, 1973

ABSTRACT OF THE DISCLOSURE

Method and apparatus for preparing contoured bags from plural layers of heat sealable flexible film, the apparatus comprising web retaining means for receiving and retaining a supply of flexible film thereon, along with a web supporting surface for receiving film from said retaining means in the form of a web, the supporting surface defining a web traveling plane. Draw roll means are provided for imparting intermittent motion and dwell to the web as it travels along the web traveling plane. A first web treating station is disposed along the support surface with web sealing-serrating means being provided for making intermittent contact with spaced points along the web for forming a generally continuous sealed-serration line. The sealed-serration line defines a predetermined isolated scrap zone along the web and is adapted for easy removal therefrom. A second web treating station is disposed along the support surface downstream from the first web treating station, the second treating station having web welding and severing means in the form of a welding bar for making intermittent contact with the web during web-dwell to weld and sever the web to form individual repeating flexible film products such as bags therefrom. In this fashion, contoured bags suitable for retaining irregularly shaped articles such as bananas and the like may be prepared. The apparatus may optionally include re-wind means which are arranged to wind the flexible film product upon a product roll, it being understood that the welding bar would be adjusted to merely seal and not sever the sides of the bags being formed along the roll.

BACKGROUND OF THE INVENTION

Field of the invention

The present invention relates generally to the apparatus and technique for preparing bag structures from plural layers of heat sealable flexible film, and more particularly to apparatus and techniques for preparing contoured bags from plural layers of such film, wherein the finished contoured bag structure may be peculiarly adapted to retain and confine irregularly shaped articles such as bananas or the like. The apparatus is provided with means for intermittently advancing a web of flexible film along a traveling plane, and first web treating means are disposed along the plane for sealably serrating the web along a certain predetermined serration line so as to define an isolated scrap zone along the web. Thereafter, the web is moved to a second web treating station wherein a welding and severing operation occurs in which the web is welded and severed along a line which is generally transverse to the axis of the web. Following the welding and severing of the structure, the individual formed products are moved along a conveyor or the like and stacked in superimposed relationship, one upon the other, such as upon a wicket loader or the like. In this manner, individual side-welded bag styles are formed having predetermined configurations or profiles matching that of a product arranged to be retained within the bag envelope.

Description of the prior art

The apparatus of the present invention constitutes an improvement over those devices disclosed and claimed in U.S. Pat. No. 2,947,345, G. T. Schjeldahl, "Machine for Making Articles From Multiple Thermoplastic Webs" dated Aug. 2, 1960, this patent being assigned to the same assignee as the present invention.

In this prior patent, apparatus is described for the handling and treating of thermoplastic webs, particularly superimposed multpile thermoplastic webs which are treated with a hot knife or welding bar performing a simultaneous severing and welding operation on the superimposed webs. This structure is capable of providing side-weld bags and the like of regular rectangular configuration. The apparatus for sealably serrating the web may be conveniently utilized as an attachment apparatus to the structure disclosed and claimed in U.S. Pat. No. 2,947,345.

SUMMARY OF THE INVENTION

The apparatus of the present invention is capable of providing side-weld bags with a contoured configuration so as to provide containers for the packaging of articles having an irregular or contoured configuration such as bananas, or the like. It is frequently desirable to provide transparent contoured bag structures for the display, sale, and/or handling of irregularly shaped articles. Such bag structures are frequently desired in retail grocery establishments where bananas and other irregularly shaped articles are prepackaged for display and sale.

In the past, when it was desired to prepare a contoured bag, the technique normally employed the removal of a certain prescribed scrap zone from the web prior to the completion of the product. Such prior apparatus would normally be constructed so as to form a simultaneous welding and severing operation along the edge of the finished product. The removal of the scrap zone from the web prior to the completion of the product is undesirable in certain instances, since the web width is reduced by removal of the scrap zone, and thus anomalous affects occur in the operation of the apparatus.

In accordance with the present invention, the technique and apparatus treats the traveling web so as to provide a continuous sealed serration which defines a scrap zone, this scrap zone being permitted to remain intact in the web until the individual bag bodies have been separated from the remainder of the web. Thereafter, following the separation of the web into individual bag structures, wicket means are provided for stacking the bags in any desired manner. The scrap portion may be removed immediately prior to the loading of the product into the bag.

It has been found that this technique provides greater stability in the web, and thereby avoids the tendency of the web to sag or break while being fed through the machine and treated by certain operational apparatus. In other words, the web remains intact until the ultimate welding and severing operation, with the scrap being removed thereafter. By following this technique, it is possible to fabricate and prepare bag structures and styles having unusual contours, without limitation regarding the quantity or location of the scrap to be removed.

Therefore, it is a primary object of the present invention to provide an improved apparatus and technique for the preparation of contoured bag structures, wherein the configuration of the finished product is not controlled by the quantity or location of the scrap to be removed therefrom.

It is a further object of the present invention to provide an improved apparatus and technique for the formation and preparation of contoured bag structures from plural superimposed webs of heat sealable flexible film wherein the scrap zone is initially defined in the traveling web by a continuous sealed serration line, and with the welding and severing operation being performed after formation of the sealed serration line and prior to removal of the scrap from the web.

It is yet a further object of the present invention to provide an improved apparatus and technique for the formation of contoured bag structures from plural superimposed webs of heat sealable flexible film, wherein a scrap zone is defined along the web by the preparation of a continuous sealed or welded serration along the web, this operation being followed by a web welding and severing operation which welds the sides of the bag structure and severs the web so as to form individual bag structures containing scrap zones integral therewith, with the scrap zones not being removed until after the welding and severing operations have been completed.

Other and further objects of the present invention will become apparent to those skilled in the art upon a study of the following specification, appended claims, and accompanying drawing.

BRIEF DESCRIPTION OF THE DRAWING

FIG. 1 is a schematic illustration of a typical apparatus useful in carrying out the technique of the present invention, and illustrating the web handling means, the serrating station, the welding station, and the stacking station;

FIG. 2 is a perspective view showing the arrangement and details of the web serrating and welding stations;

FIG. 3 is a bottom plan view of the web serrating platen shown in FIG. 2; and

FIG. 4 is a top plan view of a segment of the web as it appears in its travel between various stations of the apparatus prepared in accordance with the present invention.

DESCRIPTION OF THE PREFERRED EMBODIMENT

In accordance with the preferred embodiment of the present invention, and with particular attention being directed to FIG. 1, the bag-making apparatus generally designated 10 includes web retaining means 11 and 12 which deliver superimposed webs 13 and 13a to a web supporting surface 14. While the apparatus, as illustrated, discloses a pair of superimposed webs being held on the web retaining means and delivered to the web supporting surface 14, it will be appreciated that a folded web may be employed so as to avoid the necessity of providing a seal between the superimposed webs all in the area which will ultimately become the bottom of the bag. Accordingly, a pre-folded web may be employed along the web retaining means, or, perhaps more customarily, a single web roll will be supplied with a folding plow being interposed along the web so as to fold the material into two superimposed layers with a fold line being provided along the surface which will ultimately become the bottom of the bag. It will be further appreciated that the web supporting surface 14 may be in the form of a conveyor or the like, with the web supporting means also including other supporting surfaces along the extent of travel of the web 13.

As the web moves along the various treating stations, it is first passed through or exposed to a punching station, such as the punching station generally designated 15, which includes a punch head member 16, along with a back-up pad 17. The details of the punching station are disclosed and claimed in U.S. Pat. No. 3,550,494 dated Dec. 29, 1970, Richard C. Adams et al., "Multi-Punch System For Flexible Film Products," which patent is assigned to the same assignee as the present invention.

The web serrating station is shown generally at 20, and includes a support member or table 21 along with a serrating platen 22 which is arranged for reciprocatory up-and-down motion. Downstream from the serrating station 20 is the welding and severing station generally designated 24, this station being arranged in accordance with the details of the web welding and severing station of U.S. Pat. No. 2,947,345, referred to hereinabove. A pick-off means shown generally at 25 is utilized to advance the severed product from the web 13, and to place it onto conveyor 26 which delivers the individual bag structures onto a wicket receptacle 27, receptacle 27 being shown with a stack 28 of bags arranged in superimposed stacked relationship thereon.

With continued attention being directed to FIG. 1, it will be seen that the portion of the web 13 disposed within the station 15 is tensily isolated from that portion of the web 13 disposed within the serrating station 20. In order to accomplish this, a set of tension adjusting rolls 30—30 are provided for the web as it moves into the area of the punching station 15. Normally, drag means will be provided in the web retaining means such as along the shafts 11 and 12, or along the surface of the rolls retained thereon, in order to provide tension at a suitable level for the web 13 within the area of the punching station 15. For achieving tensile isolation of the web in these various treating stations, two pairs of coordinated draw rolls are provided, including a first draw roll pair comprising draw rolls 32 and 33, and a second pair of draw rolls 34 and 35. In order to coordinate the motion between the individual draw roll pairs, drive chains such as the chains 36 and 37 are provided. Suitable sprocket means are, of course, provided on the shafts forming the individual draw rolls 32, 33, 34 and 35. Thus, by controlling the extent of tension by a braking device disposed within the core of web retaining means 11, or along the extent of tension rolls 30—30, a first level or amplitude of tension may be established in that span of web held within the punching zone, with still another amplitude of tension being provided in that portion of the web 13 disposed within the serrating station 20. In order to render the tension consistent in the web serrating station 20, the individual pairs of draw rolls are driven at identical rates of speed. Thus, when the individual tension requirements for the treating stations differ, additional draw rolls are provided to isolate the individual areas, one from another.

With attention now being directed to FIG. 2 of the drawing, it will be seen that the web 13 is arranged to pass between the individual plates of the platen elements forming the serrating station 20. As has been previously indicated, these platens include the base pad 21 along with the reciprocating platen element 22, platen 22 being heated in order to provide thermal energy required to form the continuous serration line in the superposed layers forming the web 13. Also, as is indicated in FIG. 2, the web 13 may be perforated by means of punch elements 40—40, mounted within the punch head 16, and being adapted to be received within bores disposed within the pad 17. It will be appreciated that the reciprocatory motion of platen 22 is arranged to be timed with the dwell cycle for the web 13, the motion of the web 13 being controlled by the draw rolls as previously described. The design and operation of these draw rolls are shown in detail in U.S. Pat. No. 2,947,345, supra.

For purposes of forming the perforations required for the wicket loading of the individual bags, a pair of wicket punches are provided as at 41. These wicket punches are preferably in the form disclosed and claimed in U.S. Pat. No. 3,580,120, May 25, 1971, "Multi-Purpose Punch," Richard C. Adams, et al., which patent is assigned to the same assignee as the present invention. Suitable pad means are provided at the base of the wicket punches 41, such as at 42. The welding and severing station will include reciprocating weld bar 43 which is adapted to operate in cooperation with back-up roll 43a. Details of this operation are also shown in U.S. Pat. No. 2,947,345.

Attention is now directed to FIG. 3 for an illustration of the details of the teeth utilized to form the continuous sealed serration line in the web 13, these teeth being formed on the face of platen 22. As is illustrated these teeth individually identified as at 44—44, are arranged to perforate web 13 and provide definition for a scrap zone therein. Ideally, back-up or sealing pad 21 has a surface which is resilient in order to yield in response to the advance of teeth 44, thereby permitting the teeth to pass completely through the individual layers forming the web 13. In a typical embodiment, the material forming the sealing pad 22 is heat resistant rubber with a covering of adhesive-backed Teflon impregnated glass cloth. Such pads are, of course, commercially available. As is indicated in FIG. 1, the platen 22 may be heated by means of any suitable heating means including resistance heating elements and the like. In this connection, a Nichrome heater or the like may be employed to generate sufficient thermal energy in platen 22 to form the serration line in web 13. For polyethylene materials, a platen temperature of from approximately 600° F. to 700° F., for dwell times of approximately 1/10 second have been found useful. Thus, for a machine operating at a rate of approximately 120 cycles per minute, the contact time for the platen heated to a temperature of between approximately 600° F. and 700° F. will be about 100 milliseconds. For such a typical structure, the teeth forming the structure will be preferably 1/16 inch Nichrome wire, with the teeth being 1/4 inch in length, and spaced apart by a distance of 3/64 inch. This combination of materials, temperatures, and rates has been found ideally suited for use on 1/2 mil polyethylene film. It will be appreciated that this temperature and time relationship is not critical to the formation of serrations in webs, it being understood and appreciated that those skilled in the art can deviate from this time/temperature relationship and nevertheless obtain suitable serrations. The details provided herein have been found to provide a sealed contoured wall which is continuous, and which can be separated from the scrap zones formed during the preparation of the contour bag structure.

The pick-off means generally designated 25, as previously indicated, is also of conventional design and the details of such a station are given in U.S. Pat. 2,947,345, supra. The pick-off means 25 simply embodies a pivotally mounted arm 45, mounted on pivot shaft 46, and adapted to move in reciprocating motion as shown in arrow 47, to accommodate the contact of driven pick-off roll 48 with finished product. Roll 48 moves at a convenient peripheral rate of speed in order to advance the individual flexible film or bag products at a time immediately prior to energization of draw rolls 32, 33, 34 and 35. Such activity advances the individual flexible film product from the web, so as to form a gap between adjacent products in the fashion shown in FIG. 4 and explained in detail hereinafter. Also, as is indicated, a back-up conveyor or pad is shown for pick-off means 25 as at 49, this being in the form of a roll or a conveyor element, such as conveyor 26. If in the form of a conveyor, back-up means 49 may comprise a plurality of axially spaced webs.

Attention is now directed to FIG. 4 of the drawing wherein the configuration of the web is illustrated. In FIG. 4, the various scrap zones are shown at 50, these scrap zones being ultimately removed from the flexible film product, such as the bag area shown at 51. As the web 13 moves in the machine direction, such as in the direction of the arrow 52, the various operations as described hereinabove are performed. The separation between the individual bag elements is shown as at 53, this separation being provided by the action of the pick-off mechanism 25 described hereinabove. At the far right of FIG. 4, the removal of the scrap zone 50 is illustrated, with this scrap being removed from the flexible film product 51 in the direction of arrows 54—54.

The features of the web supply means shown at 11 and 12 are not critical to the operation. Normally, braking or drag means are provided for each of the rolls mounted on shafts 11 and 12 so as to control the rotational motion of these supply rolls, and accordingly the web tension in the punching station 15. A compensator apparatus of the type disclosed and claimed in U.S. Pat. 2,990,989, dated July 4, 1961, Harry R. Carlsen, "Compensator for Web Sheet," assigned to the same assignee as the present invention; may be employed in the web handling portion of the structure, if desired.

When a pair of individual rolls are provided, in the manner as illustrated in FIG. 1, a bottom seal device will be utilized for sealing the webs together along the portion which will ultimately define the bottom wall or seam of the bag. Such bottom seals are well known in the art and are, of course, commercially available.

If desired, the finished web may be re-wound on a roll such as is illustrated at 55 in FIG. 1. When such a rewind mechanism is utilized, the welding bar 43 and back-up roll 43a will be controlled so as to merely seal, and not sever the area adjoining mutually adjacent bag structures.

It will be further appreciated that the apparatus and technique of the present invention is adaptable for use with any of a variety of thermoplastic flexible film materials. Most prominent in this field are polyethylene, polypropylene, and the like.

It will also be appreciated that the technique of the present invention provides a serration seal which is normally approximately 75 percent closed, remainder open. The open portion is the solid bridge remaining after the serration and separation operations have been completed. It will be appreciated further, that depending upon the material utilized, an opening of approximately one-third of the length of the web may be tolerated without adverse affects.

What is claimed is:

1. In apparatus for preparing contoured bags from plural layers of heat sealable flexible film:
    (a) web retaining means for receiving and retaining a supply of thermoplastic heat sealable flexible film thereon;
    (b) means for receiving said film from said retaining means in the form of superposed layers forming a web, and for supporting said web along a web traveling plane;
    (c) draw roll means for imparting intermittent motion and dwell to said web as it moves along said web traveling plane;
    (d) a first web treating station being disposed along said web traveling plane, said first web treating station having a web perforating means, said web perforating means being arranged for intermittent contact with said web to form bore perforations therein;
    (e) a second web treating station disposed along said web traveling plane and having a web serrating means formed thereon, said web serrating means being arranged for intermittent sealing contact with spaced portions of said web for forming a generally continuous serration defining alternate edge welded openings and solid bridging elements extending between adjacent openings, thereby forming and defining isolated scrap zones along said web;
    (f) a third web treating station disposed along said web traveling plane downstream from said first web treating station and having a web welding and severing means associated therewith, said web welding and severing means including a heated welding bar arranged for intermittent reciprocatory up-and-down motion relative to said web and in time with said web serrating means for welding and severing said web to form individual repeating flexible film products; and
    (g) first web tensioning means in operative contact with said web for providing tension of a first predetermined amplitude in that portion of said web disposed in said first web treating station, and second web tensioning means in operative contact with said web for providing tension of an amplitude significantly less than said first predetermined amplitude in that portion of said web disposed in said second and third web treating stations.

2. The apparatus as defined in claim 1 being particularly characterized in that said web serrating means includes a heated platen having a plurality of serration-forming teeth extending from the surface thereof.

3. The method of preparing a contoured bag fabricated from a flexible film of thermoplastic material which comprises the steps of:
   (a) moving a pair of superimposed thermoplastic film sheets forming a web along a web traveling plane with repeating intermittent draw and dwell cycles;
   (b) bringing a punching means having a cutting surface at one end thereof into contact with said webs while at dwell and under tension to form a perforation therethrough;
   (c) bringing a heated platen means having a plurality of raised teeth forming a serrated line pattern into contact with said webs while at dwell and under relaxed tension to form an isolated scrap defining zone along said superimposed webs; and
   (d) thereafter bringing a heated bar means with a generally continuous film cutting edge formed thereon into contact with said superimposed webs while at dwell to simultaneously weld and sever said webs along a line extending generally transversely of the web axis to form a plurality of individual flexible film side-weld contoured structures.

4. The method as defined in claim 3 being particularly characterized in that the portion of the web in contact with said heated platen means is maintained at a certain first predetermined tension, while that portion of the web in contact with said perforating means is maintained under a substantially greater tension.

References Cited
UNITED STATES PATENTS

| | | | |
|---|---|---|---|
| 3,548,723 | 12/1970 | Sengewald | 156—253 |
| 3,028,576 | 4/1962 | Gerard | 156—251 |
| 2,800,163 | 7/1957 | Rusch | 156—253 |
| 3,019,573 | 2/1962 | Navikas | 156—252 |
| 2,068,456 | 1/1937 | Hooper | 156—253 |
| Re. 26,075 | 9/1966 | Canno | 156—253 |
| 3,350,988 | 11/1967 | Schultz | 156—252 |
| 3,372,797 | 3/1968 | Grevicit | 156—253 |

DOUGLAS J. DRUMMOND, Primary Examiner

U.S. Cl. X.R.

156—267, 513, 515